United States Patent
Zhou et al.

(10) Patent No.: US 8,439,696 B2
(45) Date of Patent: May 14, 2013

(54) CARD CONNECTOR WITH IMPROVED TRAY MEMBER AND METAL COVER

(75) Inventors: Jian-Bo Zhou, Shenzhen (CN); Shi-Jie Tan, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 8 days.

(21) Appl. No.: 13/302,159

(22) Filed: Nov. 22, 2011

(65) Prior Publication Data

US 2012/0129370 A1 May 24, 2012

(51) Int. Cl.
*H01R 29/00* (2006.01)

(52) U.S. Cl.
USPC .......................................................... 439/188

(58) Field of Classification Search .................. 439/188, 439/108, 345, 607.01, 607.07, 607.09, 607.13
See application file for complete search history.

(56) References Cited

U.S. PATENT DOCUMENTS

| | | | | |
|---|---|---|---|---|
| 6,692,277 | B2 * | 2/2004 | Hu et al. | 439/188 |
| 6,764,327 | B2 * | 7/2004 | Yu | 439/188 |
| 7,686,633 | B2 * | 3/2010 | Yu et al. | 439/188 |
| 7,708,598 | B2 * | 5/2010 | Hu | 439/630 |
| 7,717,724 | B2 * | 5/2010 | Yu et al. | 439/159 |
| 7,922,507 | B2 * | 4/2011 | Wang et al. | 439/188 |
| 8,282,407 | B1 * | 10/2012 | Qu et al. | 439/188 |
| 2009/0267677 | A1 | 10/2009 | Myers et al. | |

FOREIGN PATENT DOCUMENTS

TW M359106 6/2009

\* cited by examiner

*Primary Examiner* — Chandrika Prasad
(74) *Attorney, Agent, or Firm* — Ming Chieh Chang; Wei Te Chung (57) ABSTRACT

A card connector (100) includes an insulative housing (2), a metal cover (1) attached to the insulative housing to jointly define a receiving space (10), a number of contacts (3) fixed in the insulative housing, and a tray member (4) slidably received in the receiving space. The metal cover includes a first locking arm (13) extending into the receiving space. Each contact includes a contacting section (32) protruding into the receiving space. The tray member includes a frame (41) and a metal piece (42) cooperative with the frame to define a card-receiving cavity (40). The metal piece includes a first tab (421) to make contact with the first locking arm (13) when the tray member is inserted into the receiving space (10) along a tray-insertion direction.

18 Claims, 11 Drawing Sheets

CARD CONNECTOR WITH IMPROVED TRAY MEMBER AND METAL COVER

BACKGROUND OF THE INVENTION

1. Field of the Invention

The present disclosure relates to card connectors, and more particularly to SIM card connectors with tray members for releasing statics of inserted cards and with improved locking arms capable of electrostatic discharge protection.

2. Description of Related Art

A conventional tray-type card connector usually includes an insulative housing mounted with a plurality of contacts, a shell covering the insulative housing to jointly defining a receiving space, and a tray slidably received in the receiving space for loading a card.

Either Taiwan Patent Issue No. M359106 issued on Jun. 11, 2009 or U.S. Pub. No. 2009/0267677 A1 published to Myers et al. on Oct. 29, 2009, discloses such a tray-type card connector including an insulative housing, a metal cover shielding the inulative housing, a plurality of contacts fixed in the insulative housing for mounting to a PCB, a tray slidably received in the card connector, a pair of locking arms for retaining the tray, and a pair of switch contacts for detecting whether the tray is inserted in the card connector or not. In use, when a card is loaded in the tray which in turn is inserted into the card connector for electrically contacting the contacts, it is likely than not that electrostatic charges accumulated to a high level may cause electrical shock to components mounted on the PCB. Although Myers et al. disclose the tray can be formed of a conductive material which is coated by a dielectric material, and the tray is exposed for contacting grounding portions to remove the charge, detailed structures to achieve the above function are not disclosed. Besides, in case that the pair of switch contacts and the locking arms are all separately made and then mounted to the insulative housing, the number of elements of the card connector increases, which adds cost and is inefficient in connector assembling.

Hence, it is desirable to provide a card connector with improved tray member for releasing statics of an inserted card and with improved locking arms for retaining an inserted tray member.

BRIEF SUMMARY OF THE INVENTION

The present disclosure provides a card connector including an insulative housing having a bottom wall, a metal cover attached to the insulative housing to jointly define a receiving space, a plurality of contacts fixed in the bottom wall, and a tray member slidably received in the receiving space. The metal cover includes a first locking arm extending into the receiving space. Each contact includes a contacting section protruding into the receiving space. The tray member includes a frame and a metal piece cooperative with the frame to define a card-receiving cavity. The metal piece includes a first tab to make contact with the first locking arm when the tray member is inserted into the receiving space along a tray-insertion direction.

The foregoing has outlined rather broadly the features and technical advantages of the present disclosure in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF THE PREFERRED EMBODIMENTS

Figure 4:
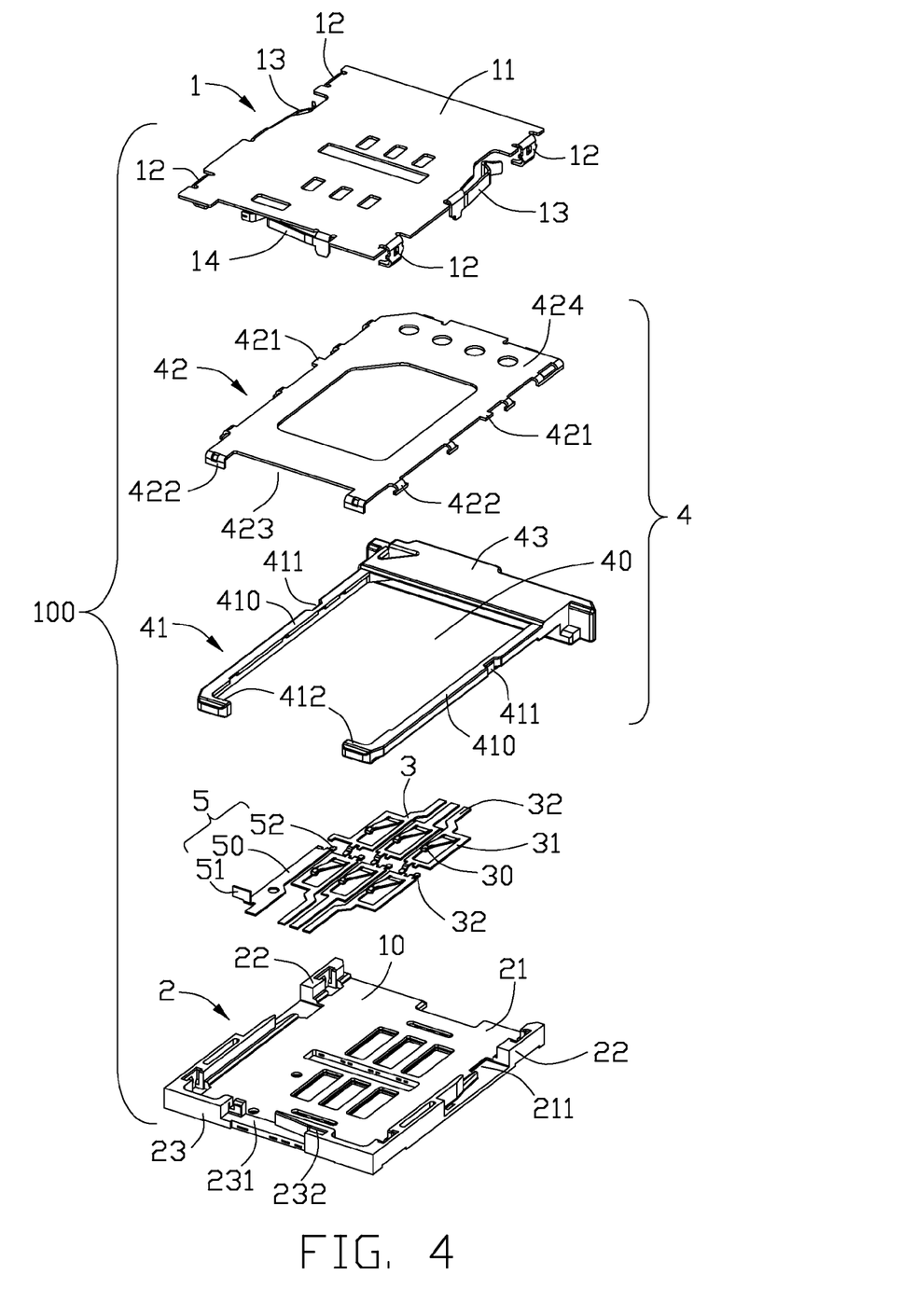
FIG. 4 is an exploded view of the card connector as shown in FIG. 3.
Figure 5:
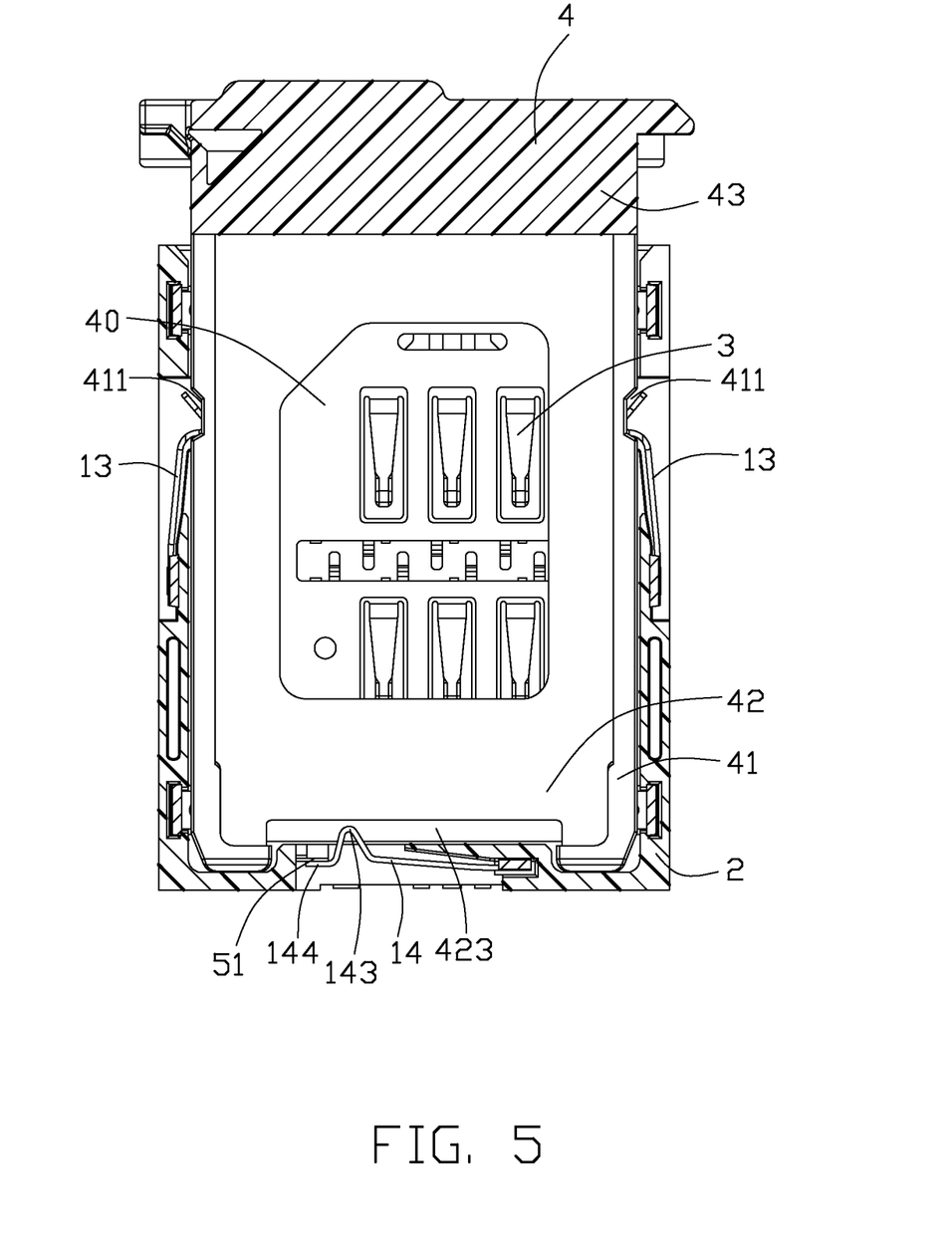
FIG. 5 is a cross-section view of the card connector taken along line 5-5 of FIG. 1, showing that a switch unit is connected when the tray member is inserted without a card.
Figure 6:
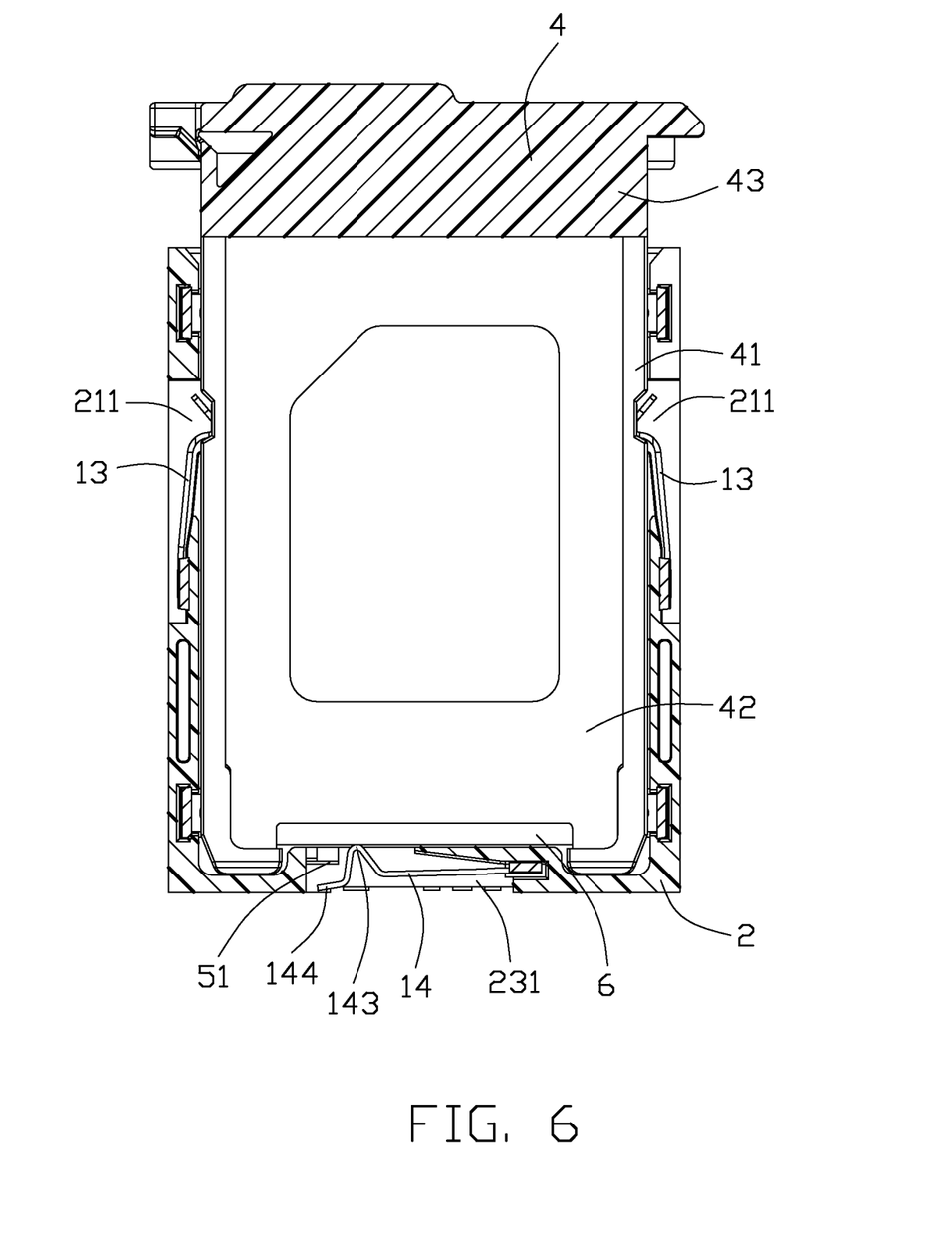
FIG. 6 is a cross-section view of the card connector similar to FIG. 5, showing that the switch unit is driven to be disconnected when the tray member is inserted with the card.

Reference will now be made to the drawing figures to describe the preferred embodiment of the present disclosure in detail. Referring to FIGS. 4 & 6, the illustrated embodiment of the present disclosure discloses a card connector 100 for receiving a card 6 (as shown in FIG. 6). The card connector 100 includes an insulative housing 2, a metal cover 1 attached to the insulative housing 2 to jointly define a receiving space 10, a plurality of contacts 3 fixed in the insulative housing 2 and a tray member 4 slidably received in the receiving space 10. In accordance with the embodiments of the present disclosure, the card connector 100 is a SIM card connector and the card 6 is a SIM card, accordingly. The tray member 4 includes a frame 41 and a metal piece 42 insert molded with the frame 41 to jointly define a card-receiving cavity 40 (as shown in FIG. 5) for loading the card 6. The tray member 4 can be inserted into the receiving space 10 along a tray-insertion direction or can be withdrawn from the receiving space along a tray-withdrawn direction opposite to the tray-insertion direction.

Figure 1:
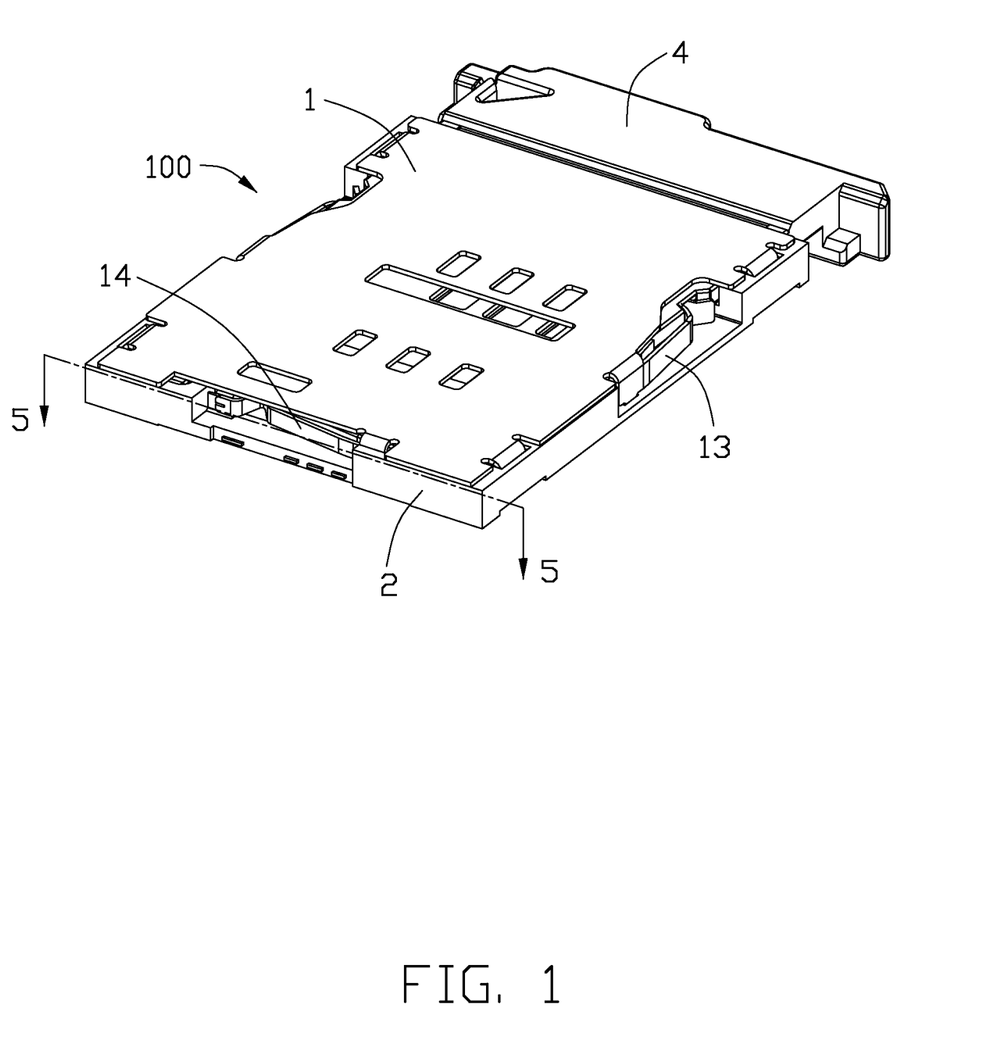
FIG. 1 is a perspective view of a card connector in accordance with a first embodiment of the present disclosure.
Figure 2:
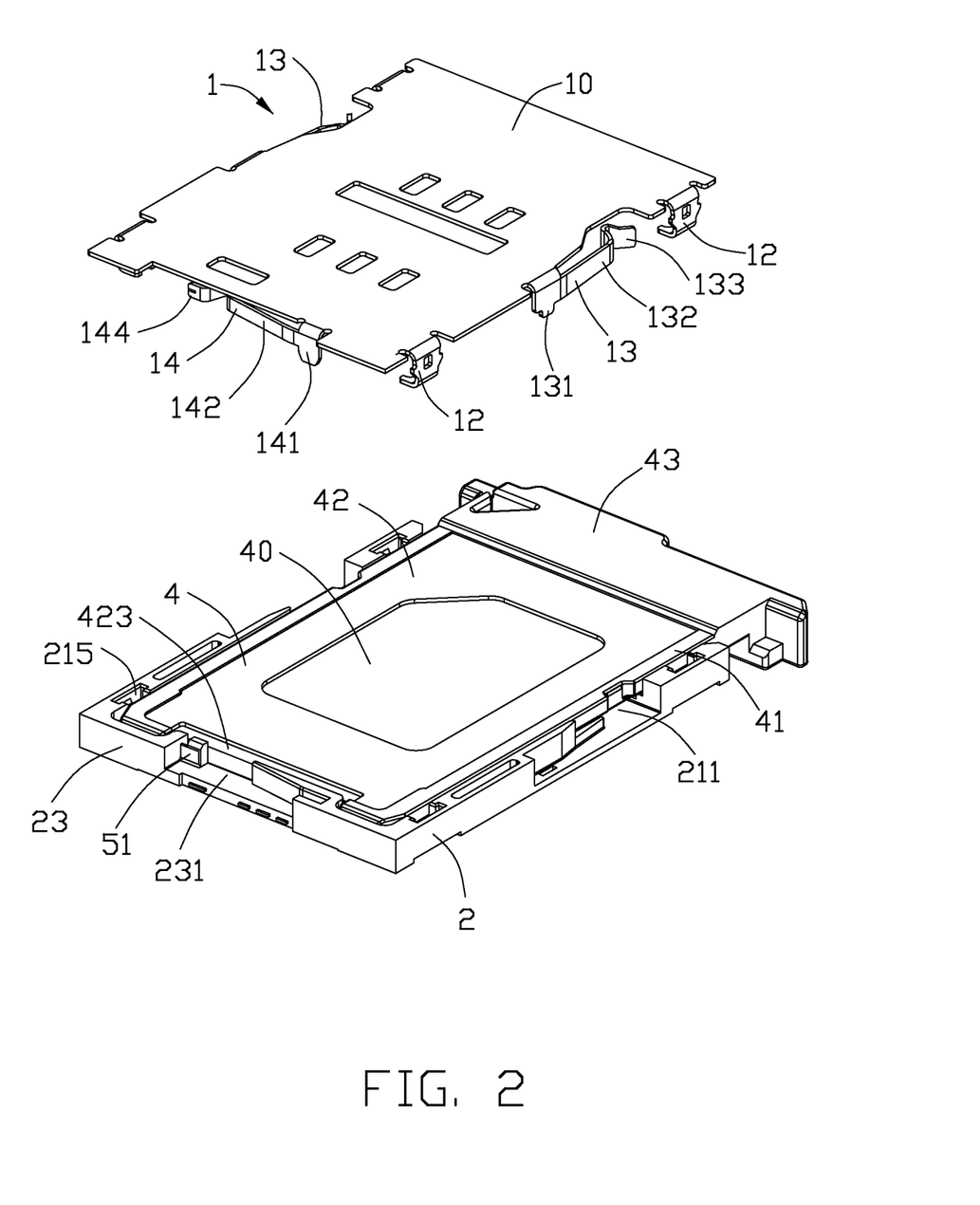
FIG. 2 is a partly exploded view of the card connector as shown in FIG. 1 with a metal cover separated from an insulative housing.
Figure 3:
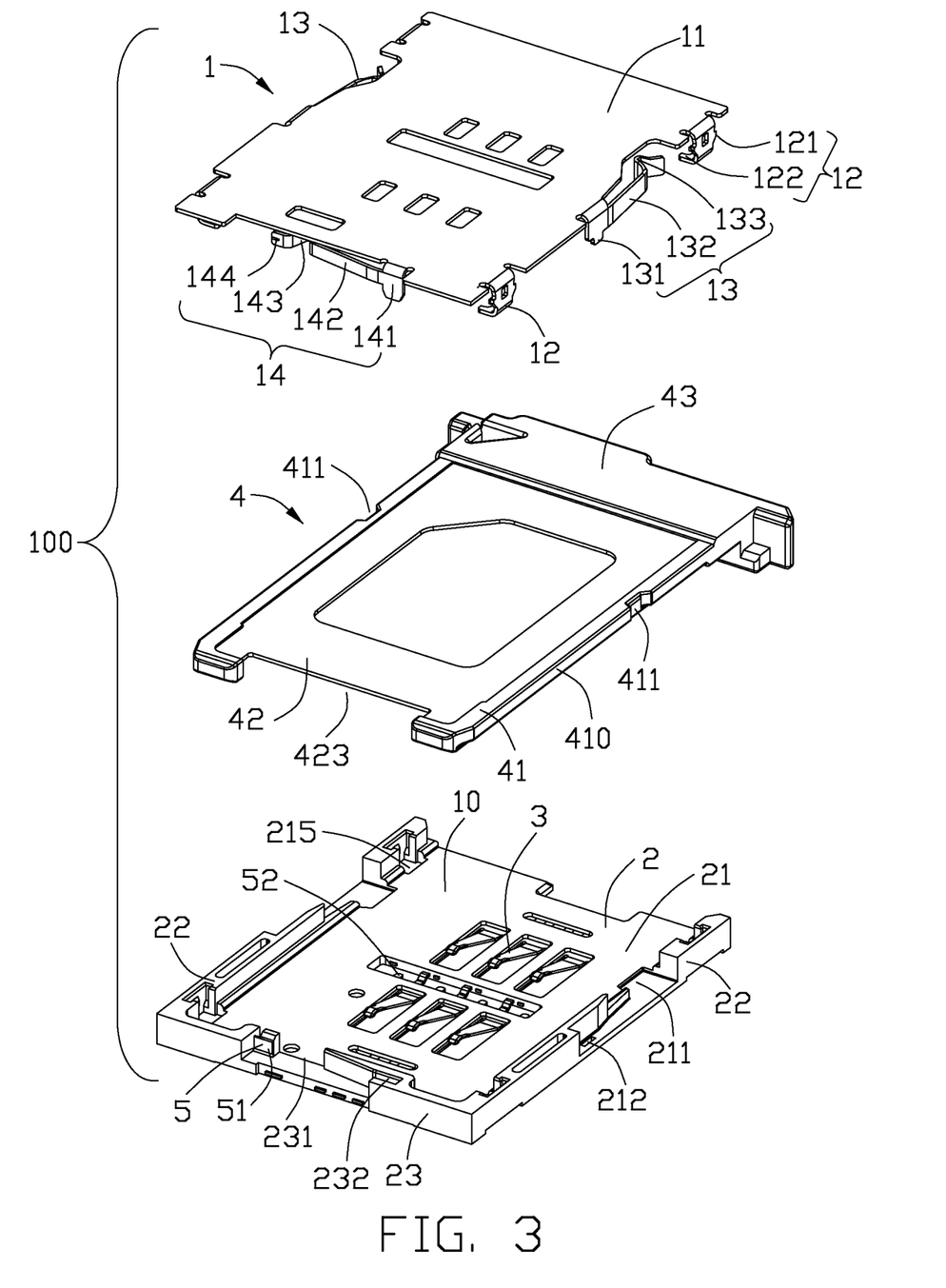
FIG. 3 is a further partly exploded view of the card connector as shown in FIG. 2 with a tray member separated from the insulative housing.

Referring to FIGS. 1 to 4, the metal cover 1 includes a top wall 11, two pairs of opposite L-shaped fixing portions 12 extending downwardly from lateral edges of the top wall 11, a pair of first and second locking arms 13 integrally extending downwardly from the lateral edges of the top wall 11 and each located between the fixing portions 12 at the same side, and a front switch arm 14 integrally extending downwardly from a front edge of the top wall 11. As shown in FIG. 3, each fixing portion 12 includes a vertical fastening portion 121 with a plurality of barbs (not labeled) and a horizontal soldering portion 122 extending inwardly from the fastening portion 121. The first and the second locking arms 13 are cantilevered and symmetrical with each other. Each of the first and the second locking arms 13 extends substantially along the tray-withdrawn direction and includes a secure portion 131 fixed in the insulative housing 2, a side cantilever 132 extending backwardly from the secure portion 131 and a curved locking protrusion 133 formed at the distal end of the side cantilever 132. Similarly, the front switch arm 14 includes a vertical retaining portion 141 fixed in the insulative housing 2, a front cantilever 142, a contacting portion 144, and a curved front protrusion 143 connecting the front cantilever 142 and the contacting portion 144. The locking protrusions 133 and the front protrusion 143 protrude into the receiving space 10.

Referring to FIGS. 1 to 4, the insulative housing 2 includes a bottom wall 21, a pair of side walls 22 extending upwardly from lateral sides of the bottom wall 21 and a front wall 23 located at a front side of the bottom wall 21. The bottom wall 21 is rectangular and defines four mounting slots 215 located at four corners thereof for receiving the fastening portions 121 of the metal cover 1. Each side wall 22 defines a side opening 211 in communication with the receiving space 10 for accommodating the first and the second locking arms 13, and a slit 212 further recessed from the side opening 211 for fixing the secure portions 131 of the first and the second locking arms 13. The front wall 23 defines a front opening 231 in communication with the receiving space 10 for accommodating the front switch arm 14 and a slit 232 for fixing the vertical retaining portion 141 of the front switch arm 14.

Referring to FIGS. 2 & 3, the contacts 3 are insert molded with the bottom wall 21 and arranged in two rows. Each contact 3 includes a rectangular fixing section 31, a contacting section 32 stamped upwardly from the fixing section 31 and a soldering section 33 extending backwardly from the fixing section 31 for being soldered onto a PCB (not shown).

Referring to FIGS. 3 to 6, in order to form a switch unit for detecting whether or not the tray member 4 or the card 6 is inserted, the card connector 100 further employs a switch contact 5 fixed in the insulative housing 2 for engaging/disengaging with the front switch arm 14 of the metal cover 1. The switch contact 5 includes a fixing portion 50, a vertical contacting portion 51 exposed to the front opening 231 and a soldering portion 52 extending from the fixing portion 50 for being soldered onto the PCB. According to the illustrated embodiments of the present disclosure, the front switch arm 14 normally makes contact with the switch contact 5 before the tray member 4 is inserted into the receiving space 10.

When the metal cover 1 is attached to the insulative housing 2, the four fixing portion 12 are fixed in the four mounting slots 215, respectively. Besides, the first and the second locking arms 13 are received in the side openings 211, and the front switch arm 14 is received in the front opening 231. The pair of the first and the second locking arms 13 face each other and are adapted for clamping the tray member 4.

Referring to FIGS. 3 and 4, the frame 41 of the tray member 4 is substantial U-shaped and includes an operation base 43 for being driven by hand, a pair of side arms 410 extending forwardly from the operation base 43 and a pair of extensions 412 extending inwardly from the side arms 410. Each side arm 410 defines a cutout 411 for locking with the first and the second locking arms 13 when the tray member 4 is inserted into the receiving space 10 at an ultimate position.

The metal piece 42 is insert molded with the frame 41 for not only enhancing the structure of the tray member 4 but also for realizing grounding purpose. The metal piece 42 includes a top wall 424, a pair of horizontal tabs 421 respectively exposed in the cutouts 411 and a plurality of hold downs 422 insert molded with the side arms 410 and the extensions 412 for fixation. As shown in FIGS. 3 to 6, the tray member 4 defines a front notch 423 corresponding to the front protrusion 143 of the front switch arm 14. As shown in FIG. 5, the front protrusion 143 is received in the front notch 423 and the contacting portion 144 of the front switch arm 14 constantly makes contact with the contacting portion 51 of the switch contact 51 when the tray member 4 is inserted into the receiving space 10 without the card 6 received in the card-receiving cavity 40. In other words, without the card 6, even if the tray member 4 is inserted into the receiving space 10, the switch unit is constantly closed and no switch signal is triggered.

As shown in FIG. 6, when the tray member 4 is inserted into the receiving space 10 with the card 6 received in the card-receiving cavity 40, because the front notch 423 is occupied by the card 6, the front protrusion 143 is driven by the card 6 to disengage with the switch contact 5. As a result, switch signal is triggered. Besides, under this condition, statics of the card 6 can be released through the locking protrusions 133 of the first and the second locking arms 13 contacting the tabs 421 of the metal piece 42. At the same time, as shown in FIGS. 5 and 6, the first and the second locking arms 13 are lockable with the cutouts 411 to prevent the tray member 4 from escaping when the tray member 4 is inserted into the receiving space 10 at the ultimate position.

Figure 7:
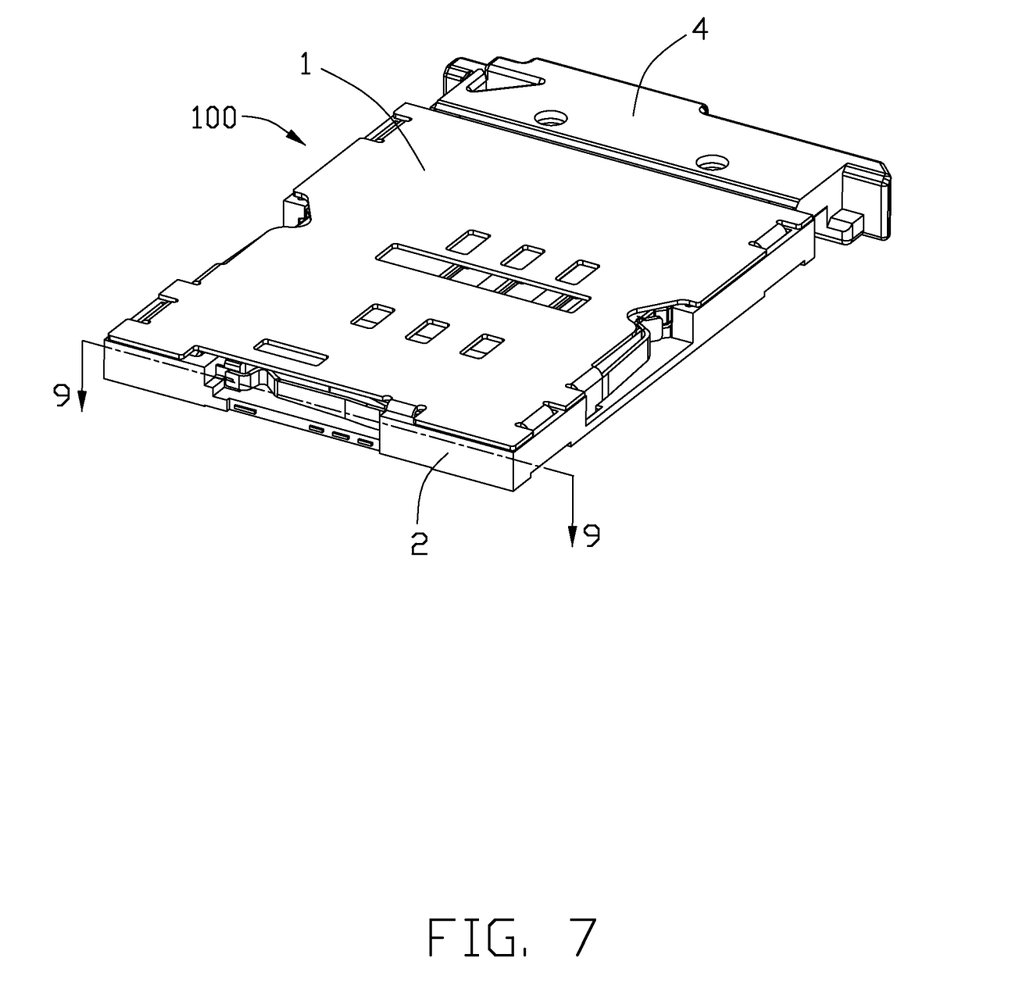
FIG. 7 is a perspective view of a card connector in accordance with a second embodiment of the present disclosure.
Figure 8:
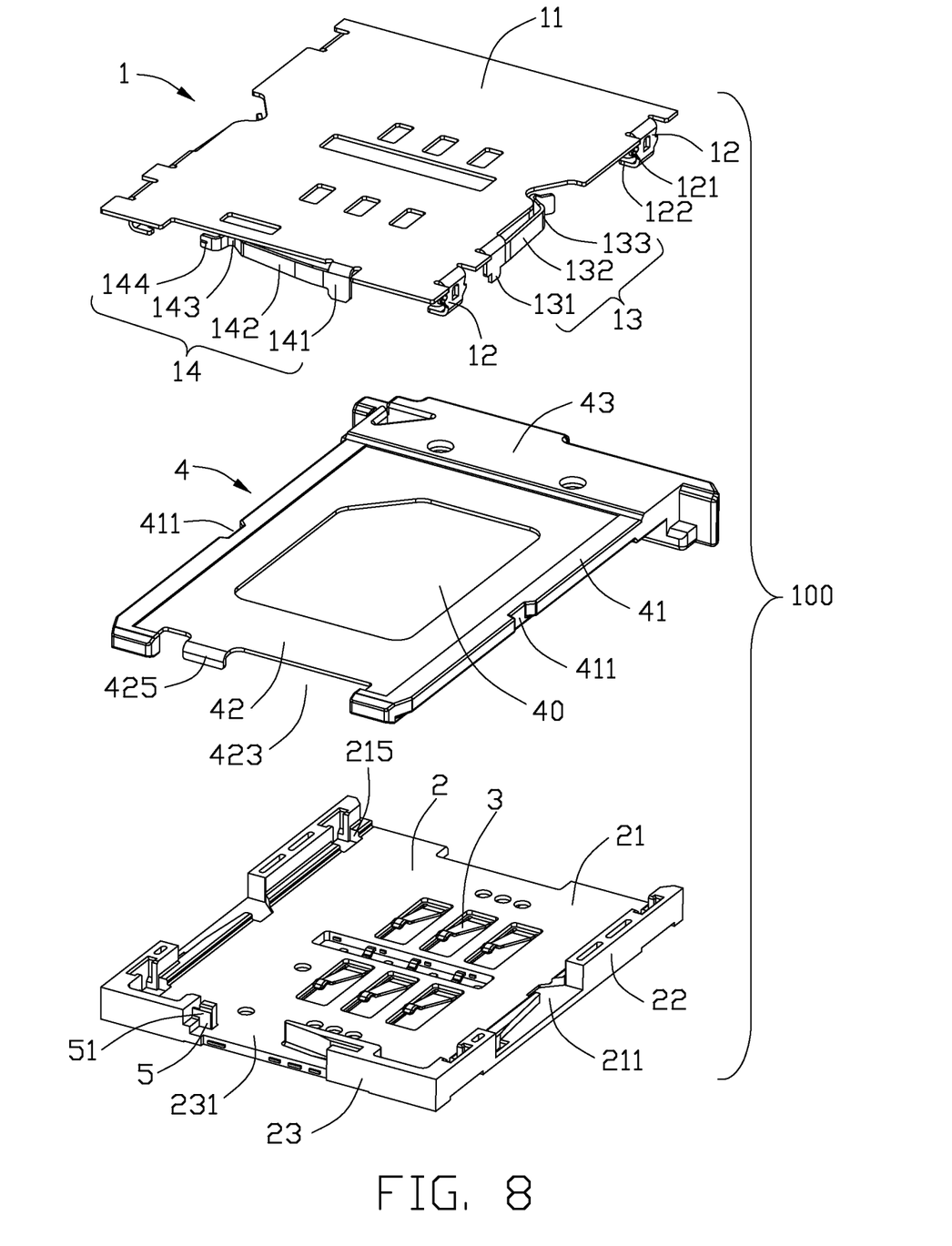
FIG. 8 is an exploded view of the card connector as shown in FIG. 7.
Figure 9:
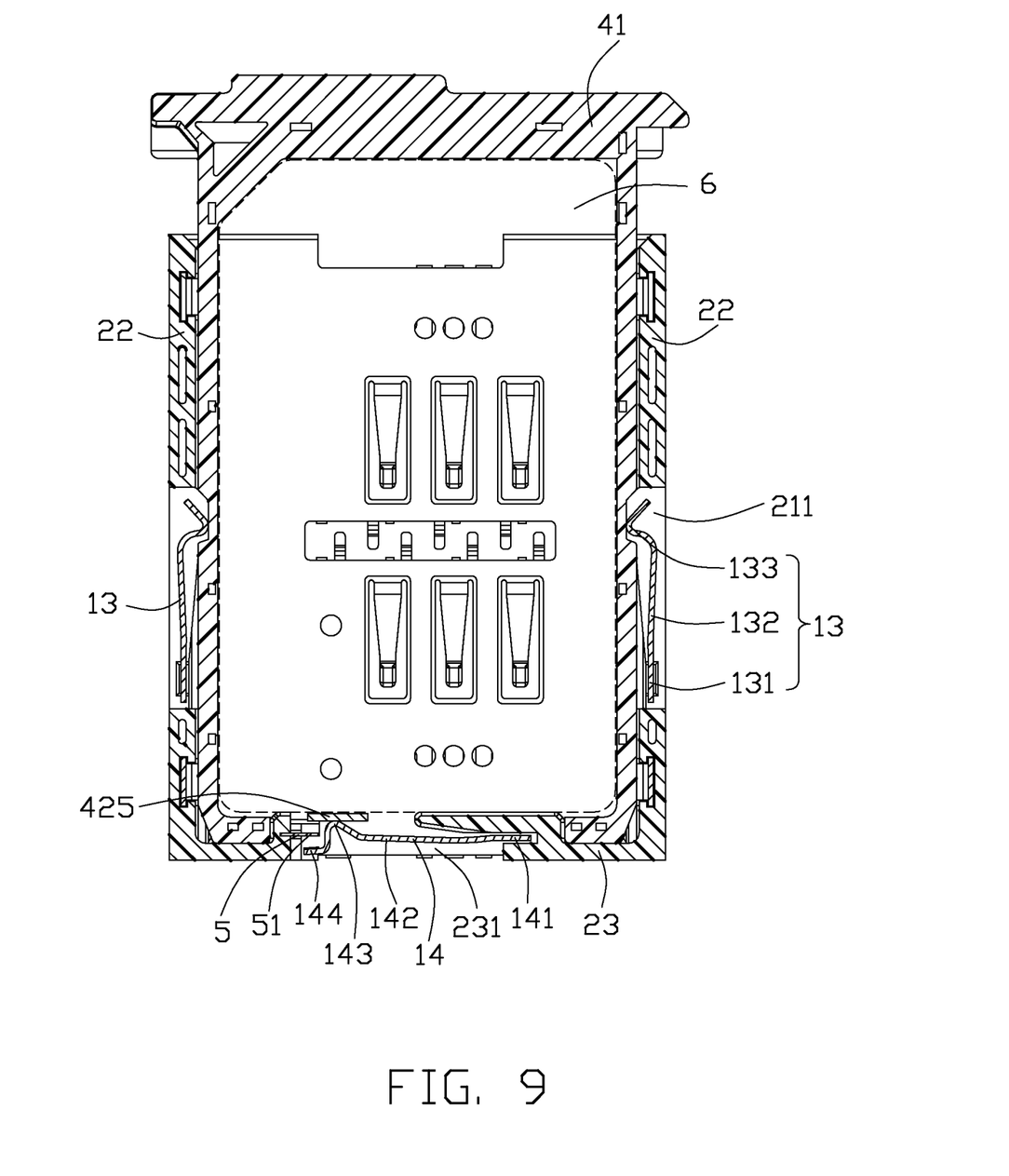
FIG. 9 is a cross-sectional view of the card connector taken along line 9-9 of FIG. 7, showing that the switch unit is driven to be disconnected when the tray member is inserted with or without the card.

Referring to FIGS. 7 to 9, a second embodiment of the present discloses another card connector 100 which is similar to the card connector 100 in the first embodiment, the only difference between them is that the tray member 4 further provides a front engaging block 425 extending downwardly from a front edge of the metal piece 42 and protruding into the front notch 423. The front engaging block 425 is adapted for driving the front protrusion 143 of the front switch arm 14 so as to determine whether the tray member 4 is inserted in the receiving space 10 or not. In other words, the front protrusion 143 is driven by the front engaging block 425 of the tray member 4 to disengage with the switch contact 5 when the tray member 4 is inserted into the receiving space 10 with or without the card 6 received in the card-receiving cavity 40.

Figure 10:
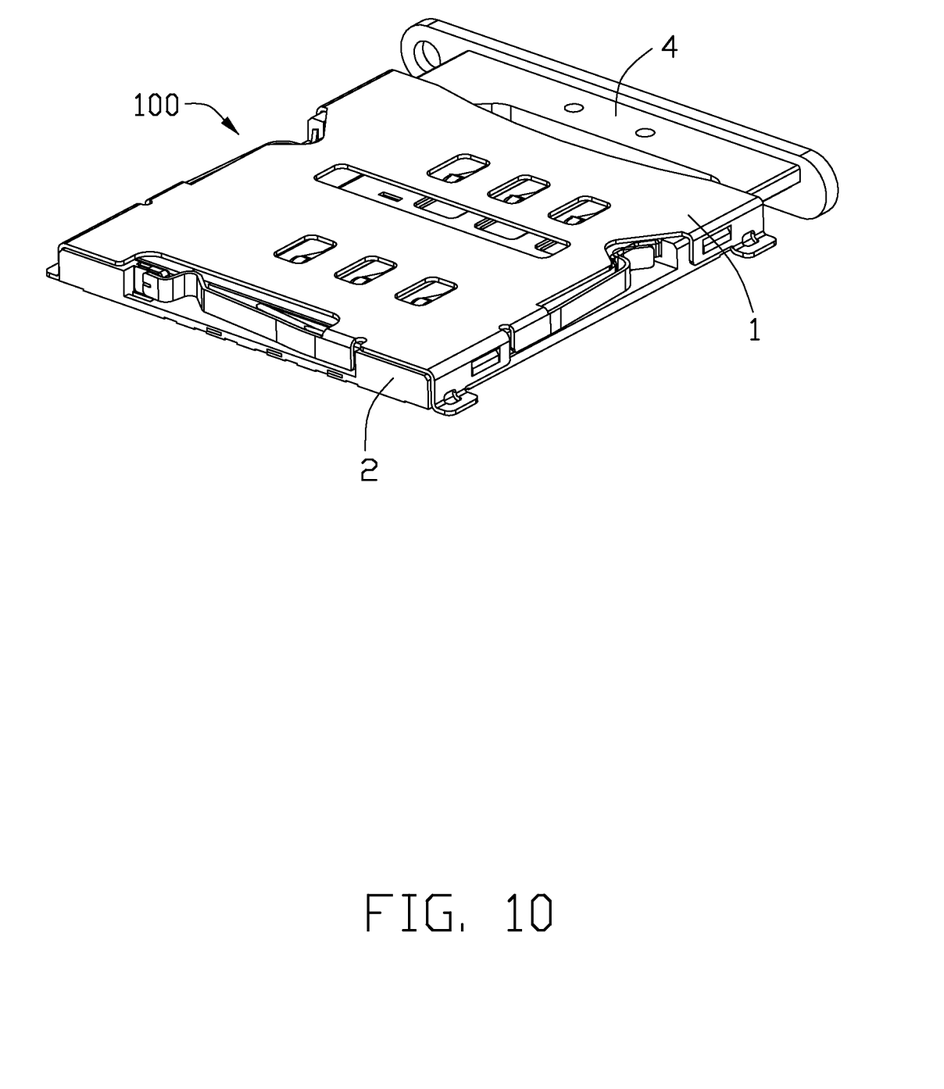
FIG. 10 is a perspective view of a card connector in accordance with a third embodiment of the present disclosure.
Figure 11:
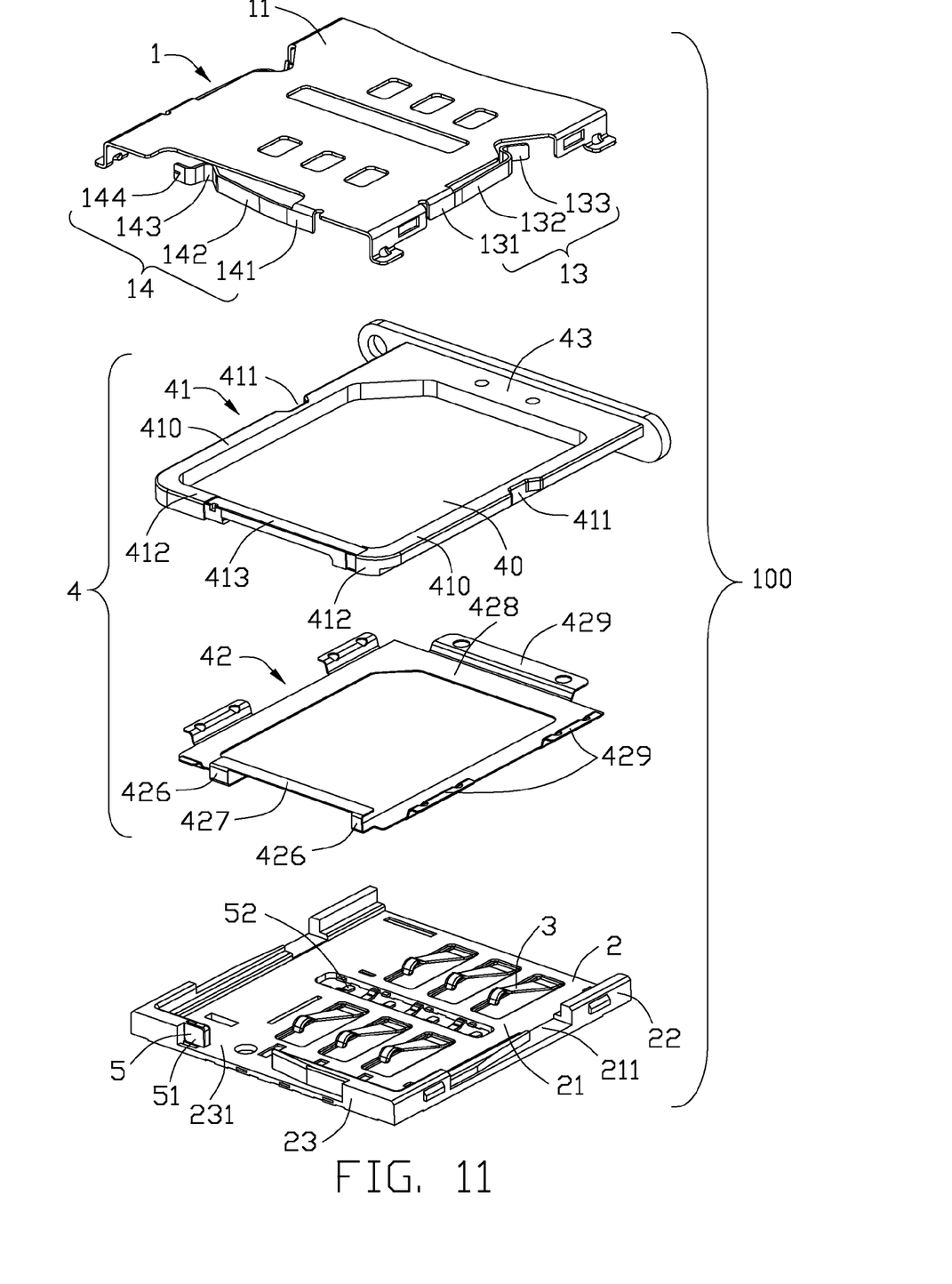
FIG. 11 is an exploded view of the card connector as shown in FIG. 10.

Referring to FIGS. 10 and 11, a third embodiment of the present discloses another card connector 100 which is similar to the card connector 100 in the second embodiment, the major difference between them is the structure of the tray member 4. The tray member 4 of the third embodiment includes an insulative frame 41 and a metal piece 42 insert molded with the frame 41 to jointly define a card-receiving cavity 40 for loading the card 6. The frame 41 is peripherally closed and further includes a connecting wall 413 bridging the pair of extensions 412 for reinforcing the frame 41. The metal piece 42 includes a supporting wall 428 for supporting the card 6, a plurality of expansions 429 insert molded with the side arms 410 and the operation base 43, a pair of vertical front engaging blocks 426 extending upwardly and a connecting section 427 bridging the front engaging blocks 426. One of the engaging blocks 426 is adapted for driving the front protrusion 143 of the front switch arm 14 so as to determine whether the tray member 4 is inserted in the receiving space 10 or not.

According to the illustrated embodiments of the present disclosure, with the first and the second locking arms 13 and the front switch arm 14 all integrally stamped from the metal cover 1, independent components thereof are reduced and manufacturing costs thereof are saved. Besides, with the cutouts 411 symmetrically disposed with each other and the first and the second locking arms 13 symmetrically disposed with each other as well, when the tray member 4 is inserted in the receiving space 10 a the ultimate position, the pair of the first and the second locking arms 13 can restrict the tray member 4 much stably. Further more, with the locking protrusions 133 of the first and the second locking arms 13 contacting the tabs 421 of the metal piece 42, statics of the card 6 can be easily released for eliminating potential safety.

It is to be understood, however, that even though numerous, characteristics and advantages of the present disclosure have been set forth in the foregoing description, together with details of the structure and function of the invention, the disclosed is illustrative only, and changes may be made in detail, especially in matters of number, shape, size, and arrangement of parts within the principles of the invention to the full extent indicated by the broadest general meaning of the terms in which the appended claims are expressed.

What is claimed is:

1. A card connector comprising:
   an insulative housing having a bottom wall;
   a metal cover attached to the insulative housing to jointly define a receiving space, the metal cover comprising a first locking arm sidewardly extending into the receiving space;
   a plurality of contacts fixed in the bottom wall, each contact comprising a contacting section protruding into the receiving space; and
   a tray member slidably received in the receiving space, the tray member comprising a frame and a metal piece cooperative with the frame to define a card-receiving cavity, the frame defining a side and the metal piece comprising a first tab exposed to the side to make contact with the first locking arm when the tray member is inserted into the receiving space along a tray-insertion direction.

2. The card connector as claimed in claim 1, wherein the side of the frame defines a first cutout in which the first tab is exposed, and the first locking arm is lockable with the first cutout to prevent the tray member from escaping when the tray member is inserted into the receiving space at an ultimate position.

3. The card connector as claimed in claim 2, wherein the metal cover comprises a top wall and a first side edge from which the first locking arm is integrally and downwardly bent, the first locking arm substantially extending along a tray-withdrawn direction opposite to the tray-insertion direction.

4. The card connector as claimed in claim 3, wherein the insulative housing comprises a first side wall defining a first side opening in communication with the receiving space, and the first locking arm is received in the first side opening.

5. The card connector as claimed in claim 3, wherein the frame comprises another side defining a second cutout opposite to the first cutout, the metal cover comprising a second side edge opposite to the first side edge and a second locking arm bent integrally and downwardly from the second side edge, the second locking arm being lockable with the second cutout when the tray member is located at the ultimate position.

6. The card connector as claimed in claim 5, wherein the first cutout and the second cutout are symmetrical with each other, and the first locking arm and the second locking arm are symmetrical with each other as well.

7. The card connector as claimed in claim 1, wherein the insulative housing comprises a front wall defining a front opening in communication with the receiving space, the metal cover comprising a front edge and a front switch arm integrally extending from the front edge, the front switch arm being received in the front opening and comprising a protrusion extending into the receiving space, the card connector further comprising a switch contact for engaging/disengaging with the front switch arm to form a switch unit.

8. The card connector as claimed in claim 7, wherein the front switch arm normally makes contact with the switch contact before the tray member is inserted into the receiving space.

9. The card connector as claimed in claim 8, wherein the tray member defines a front notch corresponding to the protrusion of the front switch arm under condition that the protrusion is received in the front notch and the front switch arm constantly makes contact with the switch contact when the tray member is inserted into the receiving space without a card received in the card-receiving cavity, and the protrusion is driven by the card to disengage with the switch contact when the tray member is inserted into the receiving space with the card received in the card-receiving cavity.

10. The card connector as claimed in claim 8, wherein the tray member defines a front engaging block corresponding to the protrusion of the front switch arm under condition that the protrusion is driven by the front engaging block to disengage with the switch contact when the tray member is inserted into the receiving space with or without the card received in the card-receiving cavity.

11. A card connector comprising:
    an insulative housing;
    a metal cover attached to the insulative housing to jointly define a receiving space, the metal cover comprising a top wall and a pair of cantilevered first and second locking arms integral with the top wall, the first and the second locking arms sidewardly protruding into the receiving space;
    a plurality of contacts fixed in the insulative housing, each contact comprising a contacting section protruding into the receiving space;
    a tray member slidably received in the receiving space along a tray-insertion direction, the tray member defining a card-receiving cavity, a front notch in communication with the card-receiving cavity and a pair of first and second cutouts on opposite sides of the card-receiving cavity; and
    a switch unit comprising an immovable switch contact and a movable switch contact for engaging/disengaging the immovable switch contact, the movable switch contact comprising a resilient arm protruding into the receiving space; wherein
    the tray member is clamped by the first and the second locking arms which are respectively lockable in the first and the second cutouts so as to prevent the tray member from escaping when the tray member is inserted into the receiving space at an ultimate position; and wherein
    (i) when the tray member is inserted in the receiving space at the ultimate position without a card received in the card-receiving cavity, the resilient arm is received in the front notch and status of the switch unit is unchanged;
    (ii) when the tray member is inserted in the receiving space at the ultimate position with a card received in the card-receiving cavity and filling in the front notch, the resilient arm is driven by the card so as to change the status of the switch unit
    wherein the tray member comprises an insulative frame and a metal piece insert molded with the insulative frame, the insulative frame comprising a base and a pair of side walls with the first and second cutouts formed thereon, respectively, the metal cover making contact with the metal piece when the tray member is located at the ultimate position.

12. The card connector as claimed in claim 11, wherein the switch unit is normally closed with the movable switch contact engaging with the immovable switch contact, while the switch unit gets opened with the movable switch contact disengaging with the immovable switch contact when the tray member is inserted in the receiving space at the ultimate position with the card received in the card-receiving cavity.

13. The card connector as claimed in claim 11, wherein the first locking arm and the second locking arm are symmetrical with each other and each of the first locking arm and the second locking arm substantially extends along a tray-withdrawn direction opposite to the tray-insertion direction.

14. The card connector as claimed in claim 11, wherein the movable switch contact is integrally formed with the metal cover.

15. A card connector comprising:
   an insulative housing defining two opposite side walls in a transverse direction and an end wall in a front-to-back direction perpendicular to said transverse direction to commonly define a receiving space therein;
   a plurality of contacts disposed in the housing with contacting sections extending into the card receiving space in a vertical direction perpendicular to both the transverse direction and the front-to-back direction;
   a metallic shell assembled upon the housing to cooperate with the housing to enclose the receiving space therein;
   a tray adapted to hold a card therein and back and forth movably received in the receiving space in the front-to-back direction, a cutout formed in a side portion of the tray corresponding to one of the side walls; and
   a deflectable locking arm unitarily formed on the shell around said one of the side walls with a locking protrusion received in the cutout for holding the tray in position without inadvertent withdrawal from the receiving space wherein the shell is equipped with a metal piece mechanically and electrically contacting said locking arm.

16. The card connector as claimed in claim 15, wherein a pair of switches are located around the end wall, of which one stationary switch is retained by the housing and the other movable switch is unitarily formed with the shell.

17. The card connector as claimed in claim 16, wherein the shell includes at least one soldering portion around the corresponding side wall while spaced from the other moveable switch in the transverse direction for connecting to a printed circuit board on which the connector is mounted.

18. The card connector as claimed in claim 15, further including another deflectable locking arm unitarily formed on the shell around the other of the side walls to cooperate with said locking arm for providing opposite forces upon the tray in said transverse direction.

* * * * *